(12) United States Patent
Le Strat et al.

(10) Patent No.: US 6,459,690 B1
(45) Date of Patent: Oct. 1, 2002

(54) CHANNEL SELECTOR DEVICE FOR MULTIPLE ACCESS DIRECT TRANSMISSION SYSTEMS BETWEEN MOBILE STATIONS

(75) Inventors: Evelyne Le Strat, Paris; Marc Delprat, Le Chesnay, both of (FR)

(73) Assignee: Alcatel Cit, Paris (FR)

(*) Notice: Subject to any disclaimer, the term of this patent is extended or adjusted under 35 U.S.C. 154(b) by 0 days.

(21) Appl. No.: 08/687,947

(22) Filed: Jul. 26, 1996

(30) Foreign Application Priority Data

Jul. 27, 1995 (FR) .............................. 95 09155

(51) Int. Cl.[7] ................................ H04Q 7/20
(52) U.S. Cl. ....................... 370/332; 370/437
(58) Field of Search .................. 370/322, 329, 370/341, 342, 437, 337, 347, 519, 455, 338, 332; 455/450, 452, 456, 442, 436, 437, 464, 578, 62, 63, 455, 516

(56) References Cited

U.S. PATENT DOCUMENTS

| | | | | |
|---|---|---|---|---|
| 3,634,627 A | * | 1/1972 | Velentini | 370/422 |
| 4,031,330 A | * | 6/1977 | Van Leeuwen | 375/240 |
| 5,203,012 A | * | 4/1993 | Patsiokas et al. | |
| 5,218,630 A | * | 6/1993 | Patsiokas et al. | 455/450 |
| 5,239,676 A | * | 8/1993 | Strawcznski | 455/437 |
| 5,375,123 A | * | 12/1994 | Andersson et al. | 370/333 |
| 5,515,366 A | * | 5/1996 | Chieu et al. | 370/347 |
| 5,561,664 A | * | 10/1996 | Gilmore et al. | 370/252 |
| 5,574,974 A | * | 11/1996 | Almgren et al. | 455/450 |
| 5,715,295 A | * | 2/1998 | Yamashita | 455/455 |
| 5,839,075 A | * | 11/1998 | Haartsen et al. | |

\* cited by examiner

*Primary Examiner*—Douglas Olms
*Assistant Examiner*—Ken Vanderpuye
(74) *Attorney, Agent, or Firm*—Sughrue Mion, PLLC

(57) ABSTRACT

A channel selector device for a multiple access system of direct transmission between mobile stations carries out measurements on various channels during calls in order to determine if there is a better channel than the traffic channel used for the call. This better channel constitutes the new traffic channel to be used.

10 Claims, 2 Drawing Sheets

CHANNEL SELECTOR DEVICE FOR MULTIPLE ACCESS DIRECT TRANSMISSION SYSTEMS BETWEEN MOBILE STATIONS

BACKGROUND OF THE INVENTION

1. Field of the invention

The present invention concerns a channel selector device for multiple access direct transmission systems between mobile stations.

2. Description of the prior art

By direct transmission between mobile stations is meant a non-relayed mode of communication, i.e. one with no infrastructure, between two or more mobile stations of a common group in a given geographical area. Given the limited power of the mobile stations, the range of such communications does not exceed a few kilometers. This mode of operation is particularly beneficial as a complement to the usual relayed mode offered by a mobile radio system. It enables communication even outside the coverage area of the infrastructure. However, it may also be used within the coverage area of the infrastructure, for example in order to avoid loading the system or because only a part of the group is in the coverage area.

By multiple access system is meant a system of sharing transmission resources enabling a plurality of simultaneous calls on separate channels using one of the following three forms of multiplexing: frequency-division multiplexing (FDMA), time-division multiplexing (TDMA), and code-division multiplexing (CDMA).

In relayed mode the allocation of radio resources is usually coordinated by the infrastructure using a predefined cellular plan and dynamic allocation of the various channels offered by the multiple access system in question to the various calls. In direct mode the absence of any such centralized coordination requires channel selection rules (usually manual) and a certain degree of discipline by users. In practice the users of a group agree beforehand to use a given channel (this is typical in professional mobile radio: PMR) or to use a "rallying" channel (or control channel) common to more than one group before "switching" to another dedicated channel (digital short range radio: DSRR).

Specific problems arise when the direct mode is designed to complement an existing TDMA (time-division multiple access) relay mode: this is the case with the GSM and TETRA systems, for example. The natural solution would be to reproduce the same TDMA operation in the direct mode in order to minimize the specification effort and to facilitate the implementation of a mobile terminal integrating both the relayed mode and the direct mode. In the direct mode, however, in the absence of any absolute time reference outside the coverage area of the infrastructure, it does not seem obvious to manage the use of the channels by time sharing as in TDMA. Assume, for example, that two groups start calls in direct mode on the same frequency but on different channels (i.e. in different time slots); as on the face of it the two groups can have any time reference, and their time references are independent, it can very well happen that the time slots used overlap at least in part with the result that the calls interfere with each other, as shown in FIG. 1 for the case of two calls COM1 and COM2 respectively using time slots 4 and 3 of a frame structure with eight time slots numbered 1 through 8, for example.

In the TETRA system this problem has been solved in a simple way by assuming that only one call per frequency is possible in direct mode. This is a simplifying solution but is greedy in terms of spectrum use. From this point of view, what may be acceptable in the case of the TETRA system in which frequencies are spaced by 25 kHz becomes exorbitant in the case of the GSM system where the spacing is 200 kHz.

The uncoordinated nature of the calls in direct mode is therefore particularly penalizing in the case of a TDMA system, where it seems on the face of it to be difficult to envisage more than one call per frequency in a given area without risk of calls interfering with each other. Even in the case of direct mode FDMA or CDMA transmission, however, malfunctions in connection with calls in the same area can happen frequently, for two main reasons:

- the traffic channel selected at the start of the call may in fact be busied by a call in the same area that was inactive at the time of the measurement but becomes active thereafter;
- two calls in two separate but closely spaced areas may be set up on the same channel and may thereafter interfere with each other if the two groups move closer together.

A direct mode with FDMA digital transmission in 25 kHz channels is defined in the digital short range radio (DSRR) system. There is also a repeater mode in which one of the mobile stations serves as a relay. The frequency band (in the 900 MHz range) comprises two control channels and 76 traffic channels. The control channel is used in the call set-up phase to transmit synchronization and signaling information and the traffic channel is selected either by the calling mobile station or by the relayed mobile station in repeater mode. In all cases, the selection of the traffic channel is based on first looking for a free channel using appropriate radio measurements. This selection mode guarantees correct operation only at the start of the call, however. The channel selected may in fact have been busied by another call that was not active at the time of the measurement but which becomes active afterwards. Moreover, given the mobile nature of the users, two groups initially located in different areas may select the same traffic channel and then interfere with each other upon moving close together.

SUMMARY OF THE INVENTION

One object of the present invention is to avoid the aforementioned problems.

The present invention consists in a channel selector device for a multiple access system of direct transmission between mobile stations, including means for carrying out measurements on various channels during calls in order to determine if there is a better channel than the traffic channel used for said call, said better channel constituting the new traffic channel to be used.

Other objects and features of the present invention will emerge from a reading of the following description of one embodiment of the invention given with reference to the appended drawings.

DETAILED DESCRIPTION OF THE PREFERRED EMBODIMENT

Figure 1:
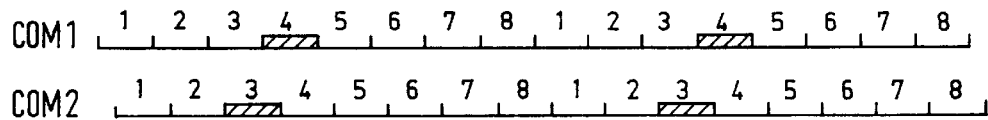
FIG. 1 illustrates the case of two calls interfering with each other in a TDMA system of direct transmission between mobile stations.

The invention essentially consists in adding to the transmission mode provided for the direct mode (whether this is TDMA, CDMA or FDMA) a dynamic channel selector mechanism whereby, during calls, measurements are carried out on various channels in order to determine if there is a better channel than the traffic channel currently used for the call, this better channel constituting the new traffic channel to be used.

For example, in the embodiment described hereinafter:

during calls, measurements are carried out on the traffic channel in use to determine if the transmission on that traffic channel is suffering excessive interference, a new traffic channel is selected if the transmission is found to be subject to excessive interference.

The traffic channel can be selected at the start of the call, in either of two known ways:

either, in a very simple manner, by agreeing on a predefined channel, without verifying that the latter is free, this mobile station then informing the other mobile stations of the group using a common control channel, or, more efficiently, using appropriate radio measurements usually carried out by the mobile station that sets up the call, in order to identify a free traffic channel, this mobile station then informing the other mobile stations of the group of the identity of this channel using a common control channel.

The measurements carried out on the traffic channel used during calls to determine if the transmission on that traffic channel is subject to excessive interference can be effected:

either by a sending mobile station if the latter has regular time slots during which it interrupts transmission and "switches" to receive mode to listen to the traffic channel, measure the level received on that channel and determine if this level, which constitutes the interference level for the call in progress, is acceptable (i.e. below a given threshold), or if the channel must be changed;

or by a receiving mobile station which:

if a transmission is in progress, measures the quality of the signal received on the traffic channel and thereby determines if this quality is acceptable (i.e. above a given threshold), or if the traffic channel must be changed, if no transmission is in progress, measures the level received on the traffic channel and determines if this level, which constitutes the interference level of the call in progress, is acceptable (i.e. below a given threshold), or if the channel must be changed.

Selecting a new traffic channel essentially consists of a sending mobile station or a receiving mobile station carrying out successive measurements of the receive level on various channels other than the current traffic channel, until it detects either a satisfactory channel (i.e. a channel for which this level is below a given threshold) or the best of the channels deemed to be satisfactory, the channel detected in this way constituting the new traffic channel.

In the case of a TDMA system, for example, a satisfactory channel (or time slot) could be looked for by successively measuring the receive level for each time slot other than the time slot used for the call in progress and then, if none is satisfactory, repeating the operation with the frame structure of the mobile station which makes the selection time shifted by a fraction of a time slot (for example, one quarter or one half of a time slot) to allow for a possible time shift between the time reference of the group of which the mobile station carrying out the measurements is part and the time reference of each of the other groups for which a call is in progress.

Figure 2:
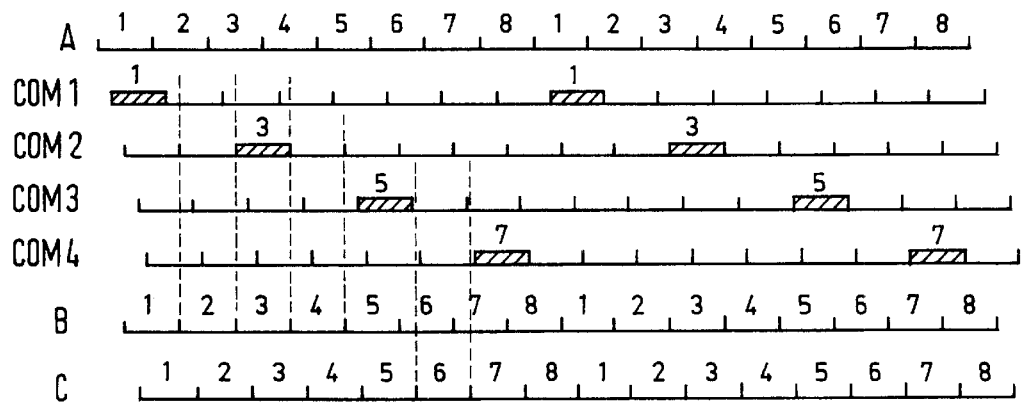
FIG. 2 shows the time shift applied to a mobile station carrying out channel selection in the case of a TDMA system of direct transmission between mobile stations.

FIG. 2 shows a time shift of this kind and refers to the example of four calls COM1, COM2, COM3 and COM4 respectively using time slots 1, 3, 5 and 7 of a frame structure with eight time slots.

If the time reference of the mobile station that selects the channel is such that the frame structure produced by that mobile station is the one shown at A, all the time slots of the frame structure are (partially) occupied.

On the other hand, if this frame structure is shifted by about ¼ time slot, as shown at B, then two time slots are available, in this example time slots 2 and 4.

A third available time slot, in this example time slot 6, can be found by a shift of approximately ¾ time slot, as shown at C.

To be sure of finding all the available time slots it would in theory be necessary to try all possible time shifts, i.e. to have a sliding window the size of a time slot and shifted one sample at a time, but this is relatively costly in terms of computation time.

In a TDMA system, in which transmission is discontinuous, channels other than the current traffic channel are simple to listen to during time periods separating the time slots used for traffic.

In an FDMA or CDMA system, in which transmission can be continuous, it may be necessary to interrupt transmission to perform the listening.

The terminal which selects a new traffic channel then advises the other terminal or terminals of the group of the identity of the new traffic channel to be used and if necessary, in the above example of application to a TDMA system, the time shift applied to find a satisfactory time slot, this time shift having to be applied also by the other terminals of the group.

The terminals to be advised of the identity of the new traffic channel to use may be either, in a basic mode, the terminals of the group participating in the call in progress, or, in a mode including additional options such as late entry or double listening, all of the terminals of the group.

The late entry function enables late comer users (not present at the time of call set-up) to join the call in progress, so enabling open channel type operation. To provide this function in direct mode, one of the mobile stations involved in the direct mode call must periodically broadcast a late entry message (synchronization, call set-up signaling) on a known channel. Here the known channel is the direct mode control channel, if there is one, or, outside the coverage of the infrastructure, the relayed mode control channel, provided that the infrastructure is advised of direct mode calls in progress.

The double listening function enables a mobile station in the coverage of the infrastructure to monitor relayed mode calls while operating in direct mode and vice versa. To this end, the mobile station operating in direct mode must also be synchronized to a base station of the infrastructure and must periodically "listen to" the control channel of that base station in order to pick up relayed mode call set-up messages that concern it. Conversely, the mobile station operating in relayed mode must listen to the direct mode common channel in order to pick up direct mode call set-up messages that concern it.

The terminal that selects a new traffic channel can be either the one which detects that transmission on the current traffic channel is subject to excessive interference, so that it is necessary to select a new traffic channel, or another terminal, provided that the channel has previously been advised of the need to select a new traffic channel by the terminal which detected that transmission on the current traffic channel was subject to excessive interference.

The information exchanged in this way constitutes signaling information that is added to the signaling information already transmitted in the systems in question and which can therefore utilize the same transmission principles, not described here.

With a TDMA system of this kind it is therefore possible to have more than one call per frequency in a given area. It is not on the face of it possible to load a frequency completely (for example with eight full rate calls per frequency in the GSM system), as this would presuppose perfect synchronization of calls in the same area, but by using an appropriate channel selection procedure it is possible to achieve at least half of the theoretical maximum.

Figure 3:
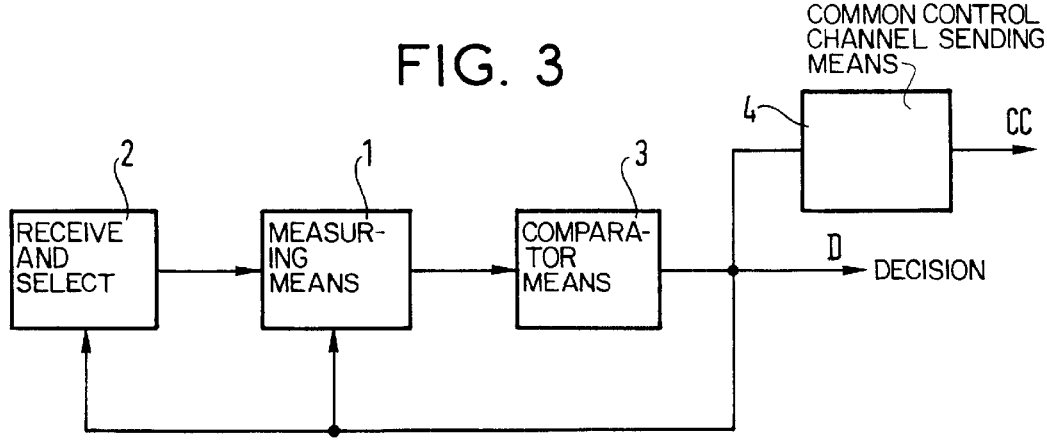
FIG. 3 is a diagram illustrating one embodiment of a device in accordance with the invention.

FIG. 3 is a block diagram illustrating one embodiment of a device in accordance with the invention.

This device includes:

means 1 for carrying out on a given channel Ci, as previously indicated, measurements either of receive levels or of receive signal quality by techniques that are known in themselves and are not described here, means 2 for receiving the channel Ci to be measured and selecting it from a set of possible channels C1 through Cn, this channel Ci being, as previously indicated, either the current traffic channel (if it is a question of determining whether the traffic channel is subject to excessive interference) or another channel (if it is a question of selecting a new traffic channel) and in the latter case, also as previously indicated, the succession of the various channels envisaged, means 3 essentially for comparing to an appropriate threshold the measurement results from the means 1 and where applicable for comparing several of these measurement results with each other, as previously indicated.

The output of the means 3 is a decision D either to retain the current traffic channel or to select a new traffic channel and, in the latter case, in a TDMA system, either a time shift command to be applied to the time reference of the mobile terminal including the device in question or the identity of the new traffic channel selected.

This decision, which constitutes the output of this device, is additionally applied:

to a control input of the means 2, for selecting the next channel to be measured, as follows from the operation described previously, and if necessary, in a TDMA system, to apply an appropriate time shift command to the time reference of the mobile terminal in question, to a control input of the measuring means 1 to determine the threshold to be used in the means 3, as also follows from the operation described previously, to a control input of the common control channel (CC) sending means 4 (these means are conventionally provided in the mobile terminal including the device in question, in order to transmit the signaling messages transmitted by the channel selector mechanism, as previously described).

The next channel selector device as shown in FIG. 3, for example, is intended to be included in mobile terminals adapted to use the direct mode.

Figure 4:
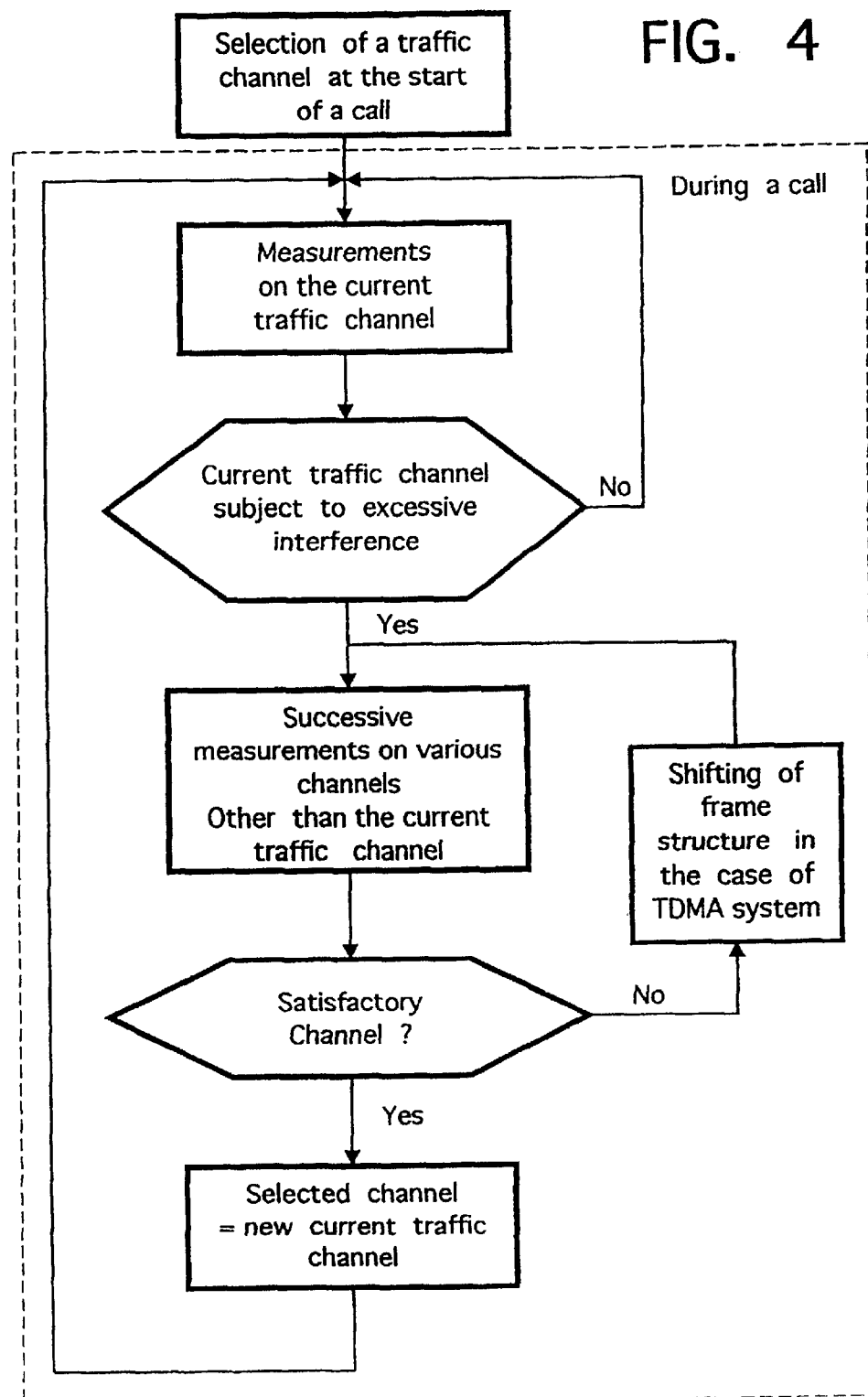
FIG. 4 is a flow chart illustrating the operation of a channel selector device according to one embodiment of the invention.

An example of how a channel selector device (such as the one shown in FIG. 3) repeats the measurements during a call is shown in the flow chart of FIG. 4.

Note that the present invention is not limited to the embodiment described. In particular, it is not necessary to wait to determine that the traffic channel is subject to excessive interference before selecting a new traffic channel; on the contrary, measurements could be carried out at regular intervals, or even continuously, in order to determine if there is a better channel than this traffic channel.

There is claimed:

1. A channel selector device for a multiple access system of direct transmission between mobile stations, comprising:

means for receiving various channels;

means for carrying out measurements on said various channels during calls, said calls taking place by direct transmission between said mobile stations; and means for determining if there is a better channel having a better signal quality, or less interference, than a channel used for said calls, said better channel constituting a new traffic channel for said direct transmission between said mobile stations.

2. Device according to claim 1, wherein said means for carrying out measurements on said various channels carry out measurement on a traffic channel in use during said calls; and said means for determining if there is a better channel detect if transmission on said traffic channel is subject to excessive interference, and select the new traffic channel upon determining that said transmission is subject to excessive interference.

3. Device according to claim 2, wherein said means for carrying out measurements on said various channels comprise means for carrying out successive measurements of a receive level on various channels, other than said channel in use for said calls, until said better channel is determined.

4. Device according to claim 3 for a time-division multiple access system wherein said means for determining if there is a better channel output a time shift command if said better channel is not determined, said time shift being applied to a time reference of said mobile station including said means for receiving, and said means for carrying out measurements on said various channels further comprise means for repeating said measurements of said receive level if said better channel is not detected after applying said time shift.

5. A mobile station comprising: means for transmitting on a common control channel; and a channel selector device for a multiple access system of direct transmission between mobile stations, said channel selector device further comprising:

means for receiving various channels;

means for carrying out measurements on said various channels during calls, said calls taking place by direct transmission between said mobile stations; and means for determining if there is a better channel having a better signal quality, or less interference, than a channel used for said calls, said better channel constituting a new traffic channel for said direct transmission between said mobile stations, wherein said means for sending a signal on a common control channel transmit an identity of new traffic channel on said common control channel.

6. A method of selecting channels in a multiple access system of direct transmission between mobile stations, said method comprising the steps of:

receiving various channels;

carrying out measurements on said various channels during calls, said calls taking place by direct transmission between said mobile stations;

determining if there is a better channel having a better signal quality, or less interference, than a channel used for said calls; and selecting said better channel as a new traffic channel for said direct transmission between said mobile stations.

7. The method according to claim 6, wherein said step of carrying out measurements further comprises carrying out measurement on a traffic channel in use during said calls;

said step of determining further comprises detecting if transmission on said traffic channel is subject to excessive interference; and said step of selecting further comprises selecting said better channel as the new traffic channel upon determining that said transmission is subject to excessive interference.

8. The method according to claim 7, wherein said step of carrying out measurements further comprises carrying out successive measurements of a receive level on various channels, other than said channel in use for said calls, until said better channel is determined.

9. The method according to claim 8, for a time-division multiple access system, wherein said step of determining further comprises outputting a time shift command if said better channel is not determined, said time shift being applied to a time reference of said mobile station, and said step of carrying out measurements further comprise repeating said level measurements if said better channel is not detected after applying said time shift.

10. A method of direct transmission between mobile stations in a multiple access system, said method comprising the steps of:

transmitting a common control channel;

receiving various channels;

carrying out measurements on said various channels during calls, said calls taking place by direct transmission between said mobile stations;

determining if there is a better channel having a better signal quality, or less interference, than a channel used for said calls;

selecting said better channel as a new traffic channel for said direct transmission between said mobile stations; and transmitting an identity of the new traffic channel on said common control channel.

* * * * *